United States Patent [19]

Peters et al.

[11] 4,104,219

[45] Aug. 1, 1978

[54] PRINTING INK

[75] Inventors: Victor Peters, Windach-Schöffelding; Franz Krammer, Friedberg, both of Fed. Rep. of Germany

[73] Assignee: ALKOR Gesellschaft mit beschränkter Haftung Kunststoffverkauf, Munich-Solln, Fed. Rep. of Germany

[21] Appl. No.: 644,527

[22] Filed: Dec. 29, 1975

[30] Foreign Application Priority Data

Jan. 8, 1975 [DE] Fed. Rep. of Germany ....... 2500500

[51] Int. Cl.$^2$ .............................................. C09D 11/10
[52] U.S. Cl. ..................... 260/29.6 RB; 260/29.6 E; 260/29.6 AQ; 260/DIG. 38; 106/20
[58] Field of Search .................. 260/29.6 R, 29.6 AQ, 260/DIG. 38, 29.6 E; 106/20

[56] References Cited

U.S. PATENT DOCUMENTS

| 3,869,484 | 3/1975 | Burke | 106/20 |
| 3,919,154 | 11/1975 | Chang et al. | 260/29.4 UA |

FOREIGN PATENT DOCUMENTS

| 158,887 | 9/1954 | Australia | 106/20 |
| 565,807 | 11/1958 | Canada | 106/20 |

OTHER PUBLICATIONS

Robbins, *Interchemical Review,* vol. 6, No. 1, pp. 16-18, Spring, 1947.

*Primary Examiner*—Allan Lieberman
*Attorney, Agent, or Firm*—Hans Berman

[57] ABSTRACT

Plastic webs, including webs of rigid and plasticized PVC, can be printed at high speed on conventional rotogravure presses with an ink whose vehicle consists of polyalkyl acrylate and polyalkyl methacrylate binder dispersed in a homogeneous, aqueous solvent in a weight ratio of 100:3 and 100:25. The imprints adhere well and resist abrasion.

6 Claims, No Drawings

PRINTING INK

This invention relates to the gravure printing of plastic bodies such as foils, films, and sheets, hereinafter jointly referred to as webs, and particularly to a novel printing ink, to its preparation, and to a printing method employing the ink.

Polyvinyl chloride (PVC) webs are commonly printed by the rotogravure method which produces imprints of superior quality at a high rate if inks based on organic solvents and vinyl copolymer binders or the like are employed. The choice of organic solvents is critical in the known methods for achieving adequate adhesion of the imprint to the PVC web. The organic solvent medium also provides the high drying rates necessary for an economically useful printing process. The amounts of solvent evaporated in an industrial printing plant from printed PVC web may amount to several tons per day. The toxic solvent cannot be recovered economically, and it presents a serious pollution problem.

It is known to decorate plastic webs by offset and screen printing methods using inks whose vehicle is a dispersion of a synthetic polymer in an aqueous medium. The problem of solvent pollution is avoided by such known inks, but they can be used only for producing simple prints lacking fine detail. Known dispersion inks cannot be used, for example, for simulating the fine grain of wood used in plastic panels, and rotogravure is the only practical method available for producing high quality prints of adequate definition.

It has now been found that rotogravure imprints of satisfactory adhesion can be produced at the high speeds and in the high quality heretofore available only from solvent-based inks by using inks whose vehicle essentially consists of a binder of esters of polyacrylic acid and polymethacrylic acid in a weight ratio between 100:3 and 100:25, the binder being dispersed in an aqueous medium. The ratio of the esters is critically important for the success of the printing method.

The inks according to the invention adequately adhere to webs consisting of polyolefins, polyesters, polyamides, polycarbonates, polyacrylates, polystyrene, ABS, SAN, and EVA, and are uniquely suited to the high-speed printing on homopolymers and copolymers consisting of vinyl chloride as the sole or predominant repeating unit.

The alcohol moieties of the polyacrylic and polymethacrylic acid esters in the ink of the invention are straight or branched alkyl or cycloalkyl having 1 to 8 carbon atoms. Because of their low cost and ready availability, the methyl and ethyl esters are preferred, and the esters having 3 to 4 carbon atoms in open chains may be economically significant where available at tolerable cost.

Blocking properties of the printed webs vary somewhat with the ratio of polyacrylic and polymethacrylic acid esters within the above range, and least blocking is normally observed at ratios between 100:4 and 100:8.

The continuous liquid phase of the vehicle in the ink of the invention is an aqueous liquid, a mixture of a minor amount of water with a major amount of methanol, ethanol, and/or propanol being preferred because of the volatility of the lower alkanols and the low toxicity of their vapors. The pH of the liquid should be in the neutral or slightly alkaline range. Preferably, the pH value is adjusted to 8 to 9.5 by means of ammonia or an amine volatile at a temperature below 100° C in the presence of water and alcohol.

The ink is prepared by intimately mixing a varnish, which is a dispersion of binder in the aqueous medium, with a pigment stock which is a uniform dispersion of pigment powder in a vehicle similar to the varnish. Preferably, 70 to 95% varnish is mixed with 30 to 5% pigment stock. The varnish more specifically may contain 10 to 30% polyacrylic acid ester, preferably in the form of an aqueous 40% dispersion, 1.5 to 4.5% polymethacrylic acid ester, preferably in a similar, aqueous, 40% dispersion, the balance being an azeotropic mixture of water and alcohol adjusted to pH higher than 8 by means of a volatile alkalinizing agent. The preferred pigment stock contains 30 – 55% polyacrylic acid ester dispersion, 40 to 65% azeotropic alcohol-water mixture, 5 to 20% pigment powder, and enough volatile alkalinizing agent for a pH above 8.

For best blocking properties, the varnish should contain 22 to 28% polyacrylic acid ester dispersion and 2 to 2.5% polymethacrylic acid ester dispersion, whereas the pigment stock optimally contains 40 to 50% polyacrylic acid ester dispersion. All percentage and part values in this application refer to percents by weight and parts by weight.

The dispersions employed in preparing the ink of the invention may be staple articles of commerce. The polyacrylate dispersions employed in preparing the varnish and the pigment stock are preferably identical.

When the ink of the invention is used in rotogravure printing, particularly employing copper printing cylinders, rigid or plasticized polyvinyl chloride web receives an imprint which dries rapidly, adheres very well, and has good abrasion resistance. The drying time may be modified by varying the ratio of water to alcohol in the continuous liquid phase which preferably contains more alcohol than water. The viscosity of the ink may be adjusted by varying the pH to match the surface of the web to be printed and the engraving depth of the printing cylinders.

The varnish of the invention cannot be combined with commercially available pigment stocks without fatally impairing the adhesion and the wet abrasion resistance of the imprint. Commercially available inks based on aqueous, synthetic resin dispersions are unsuited for rotogravure printing on PVC web.

The following Examples are further illustrative of this invention.

EXAMPLE 1

A varnish was prepared from 25 parts commercial, aqueous, 40% polyethyl acrylate dispersion, 2 parts commercial, 40% polyethyl methacrylate dispersion, 1 part aqueous ammonia, and enough of an azeotropic mixture of ethanol and water to make 100 parts varnish by weight.

Pigment stock was prepared from 45 parts of the polyethyl acrylate dispersion, 20 parts water, 32 parts ethanol, 3 parts 28% aqueous ammonia, and 13 parts pigment powder [cadmium red]. The ingredients of the pigment stock were subjected to preliminary dispersion in a dissolver, and the dispersion so obtained was further homogenized by grinding in a colloid mill.

Inks consisting of 80 to 95 parts of the varnish and 20 to 5 parts of the pigment stock were used successfully in printing on PVC foil in a conventionl rotary printing machine using gravure plates. Rates of printing and drying equal to those available on the same equipment using ink based on organic solvent systems were achieved. The printed foils showed fully satisfactory blocking behavior.

EXAMPLE 2

A varnish was prepared from 30 parts of the polyethyl acrylate dispersion and 2 parts of the polyethyl methacrylate dispersion referred to in Example 1, 1 part aqueous ammonia and an azeotropic mixture of ethanol, and water to make 100 parts.

Inks prepared from 70 to 95 parts of the varnish and 30 to 5 parts of the pigment stocks prepared in Example 1 were used for printing on polyethylene terephthalate foils on the equipment described in Example 1. The printed foils had the same desirable properties as those produced in Example 1.

It should be understood, of course, that the foregoing disclosure relates only to preferred embodiments of the invention, and that it is intended to cover all changes and modifications in the examples of the invention herein chosen for the purpose of the disclosure which do not constitute departures from the spirit and scope of the invention set forth in the appended claims.

What is claimed is:

1. A printing ink consisting essentially of 70% to 95% by weight of a varnish and 30% to 5% by weight of a pigment stock; said varnish consisting essentially of 10% to 30% by weight of an aqueous dispersion of a polyacrylic acid ester, 1.5% to 4.5% of an aqueous dispersion of a polymethacrylic acid ester, and the remainder of a liquid medium consisting of a homogeneous, neutral to slightly alkaline mixture of a minor amount of water and a major amount of an alkanol having 1 to 3 carbon atoms; said pigment stock consisting essentially of 30% to 55% by weight of an aqueous dispersion of said polyacrylic acid ester, 5% to 20% by weight of a pigment and the remainder of said liquid medium; wherein the amount of said polymethacrylic acid ester in said printing ink is between 3% and 25% of the weight of said polyacrylic acid ester in said printing ink, and wherein the alcohol moieties of said esters are alkyl or cycloalkyl having 1 to 8 carbon atoms.

2. A printing ink as set forth in claim 1 wherein the amount of polymethacrylic acid ester in said printing ink is between 4% and 8% of the weight of the polyacrylic acid ester in said printing ink.

3. An ink as set forth in claim 1, wherein said liquid medium has a pH value of 8 to 9.5.

4. An ink as set forth in claim 2, wherein said medium consists essentially of water and ethanol in a ratio substantially corresponding to that of an azeotropic mixture.

5. A method of making the printing ink set forth in claim 1 which comprises intimately mixing 70% to 95% of said varnish with 30% to 5% of said pigment stock.

6. A method as set forth in claim 5, wherein said varnish contains 22 to 28% of said polyacrylic acid ester dispersion and 2 to 2.5% of said polymethacrylic acid ester dispersion, and said pigment stock contains 40 to 50% of said polyacrylic acid ester dispersion.

* * * * *